(12) United States Patent
Miyano

(10) Patent No.: US 7,010,562 B2
(45) Date of Patent: Mar. 7, 2006

(54) ARITHMETIC CIRCUIT

(75) Inventor: Tomomi Miyano, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 574 days.

(21) Appl. No.: 10/269,856

(22) Filed: Oct. 15, 2002

(65) Prior Publication Data

US 2003/0145028 A1  Jul. 31, 2003

(30) Foreign Application Priority Data

Jan. 25, 2002  (JP)  ............................. 2002-016827

(51) Int. Cl.
*G06F 7/00* (2006.01)
*G06F 7/38* (2006.01)
(52) U.S. Cl. ...................................... 708/525; 708/490
(58) Field of Classification Search ................. 708/525
See application file for complete search history.

(56) References Cited

U.S. PATENT DOCUMENTS

| | | | | |
|---|---|---|---|---|
| 4,608,660 A | * | 8/1986 | Hasebe | 708/525 |
| 4,961,161 A | * | 10/1990 | Kojima | 708/525 |
| 5,519,649 A | * | 5/1996 | Takahashi | 708/525 |
| 5,748,515 A | * | 5/1998 | Glass et al. | 708/525 |
| 5,991,868 A | * | 11/1999 | Kamiyama et al. | 708/525 |
| 5,995,993 A | * | 11/1999 | Liang | 708/525 |
| 6,718,459 B1 | * | 4/2004 | Chiba | 708/525 |
| 6,742,013 B1 | * | 5/2004 | Griesemer | 708/525 |

* cited by examiner

Primary Examiner—Tan V. Mai
(74) Attorney, Agent, or Firm—Rabin & Berdo, P.C.

(57) ABSTRACT

An arithmetic circuit includes an arithmetic circuit performing an arithmetic operation of a predetermined bit width in accordance with an arithmetic instruction, a holding circuit storing status information about the arithmetic operation by the arithmetic circuit and a logic circuit having a function of a logic operation. The logic circuit receives the status information stored in the holding circuit and the status information about a present result of arithmetic operation. The arithmetic circuit further includes a selector for selecting either the status information about the present result of arithmetic operation or a signal outputted form the logic circuit in accordance with a control signal based on the arithmetic instruction. The selector supplies the selected signal to the holding circuit.

20 Claims, 4 Drawing Sheets

ARITHMETIC CIRCUIT

BACKGROUND OF THE INVENTION

The present invention relates to an arithmetic circuit provided in a microprocessor or the like.

When, for example, an arithmetic circuit having a 8-bit width is used to add data A and B each having a 16-bit width, thereby obtaining data C corresponding to the result of their addition, the process of adding such data has heretofore been carried out according to the following procedures.

(Procedure 1) Lower 8 bits of data A and B are inputted to the arithmetic circuit to execute an add instruction. Thus, lower 8 bits of data C are outputted from the arithmetic circuit. If a carry is produced in it, then a C flag is set to "1". If the value of the lower 8 bits of the data C is 0, then a Z flag is set to "1".

(Procedure 2) Upper 8 bits of the data A and B are inputted to the arithmetic circuit to execute an add instruction with a carry. Thus, upper 8 bits of data C are outputted from the arithmetic circuit. If a carry exists in it, then the C flag is set to "1". If the value of the upper 8 bits of the data C is 0, then the value of the Z flag is set to "1". If the value thereof is not 0, then the value of the Z flag is set to "0".

As a result, the data C indicative of the result of addition of 17 bits is obtained inclusive of the carry from the lower 8 bits of the data C obtained in the procedure 1, and the upper 8 bits of the data C and the value of the C flag both obtained in the procedure 2.

The conventional arithmetic circuit, however, has the following problems.

The value of the Z flag, which has finally been set as a result of the procedure 2, indicates whether the value of the upper 8 bits of the data C is 0, but does not indicate whether the value of 16 bits of the data C corresponding to the result of addition is 0. Therefore, there was further a need to execute the following procedures with a view toward examining whether the result of addition is 0.

(Procedure 3) The value of the Z flag, which has been set in the procedure 2, is examined. If the value of the Z flag is found to be "0", it is then determined that the result of addition is not 0. If the value of the Z flag is found to be "1", then the following procedure 4 is executed.

(Procedure 4) Check is made as to whether the value of the lower 8 bits of the data C, which have been obtained in the procedure 1, is 0. Described specifically, 0 is added to the lower 8 bits of the data C. If the value of the Z flag, which is indicative of the result of addition, is "1", then the value of 16 bits of the data C is judged to be 0.

In the conventional arithmetic circuit as described above, the value of the Z flag obtained in the final arithmetic operation does not correspond to the whole result of arithmetic operation where the arithmetic operation of numeral values each exceeding a bit width of the arithmetic circuit is carried out in a divided form. Therefore, a problem arises in that there is a need to execute add processing with a view toward obtaining the proper value of the Z flag, and the number of program-steps increases and a processing time becomes long.

Similarly, a problem arises in that when shift operations are effected on a plurality of bits, for example, the result of final shift processing is set to the C flag and left behind where one-bit shift processing is repeated plural times, and the whole result of shift arithmetic operation is not reflected on the C flag.

SUMMARY OF THE INVENTION

The present invention provides an arithmetic circuit capable of solving the problems involved in the prior art and obtaining status information with the whole result of arithmetic result reflected thereon, without the need for add processing.

An arithmetic circuit of the present invention comprises arithmetic means for performing an arithmetic operation of a predetermined bit width in accordance with an arithmetic operation instruction, holding means for holding status information about the result of the arithmetic operation by the arithmetic means, logic means for performing logic operation processing of ORing or ANDing of the status information held in the holding means and status information about the present result of arithmetic operation, and selecting means for selecting either the status information about the present result of arithmetic operation or a signal outputted form the logic means in accordance with a control signal based on the arithmetic operation instruction and supplying the same to the holding means.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

(First Embodiment)

Figure 1:
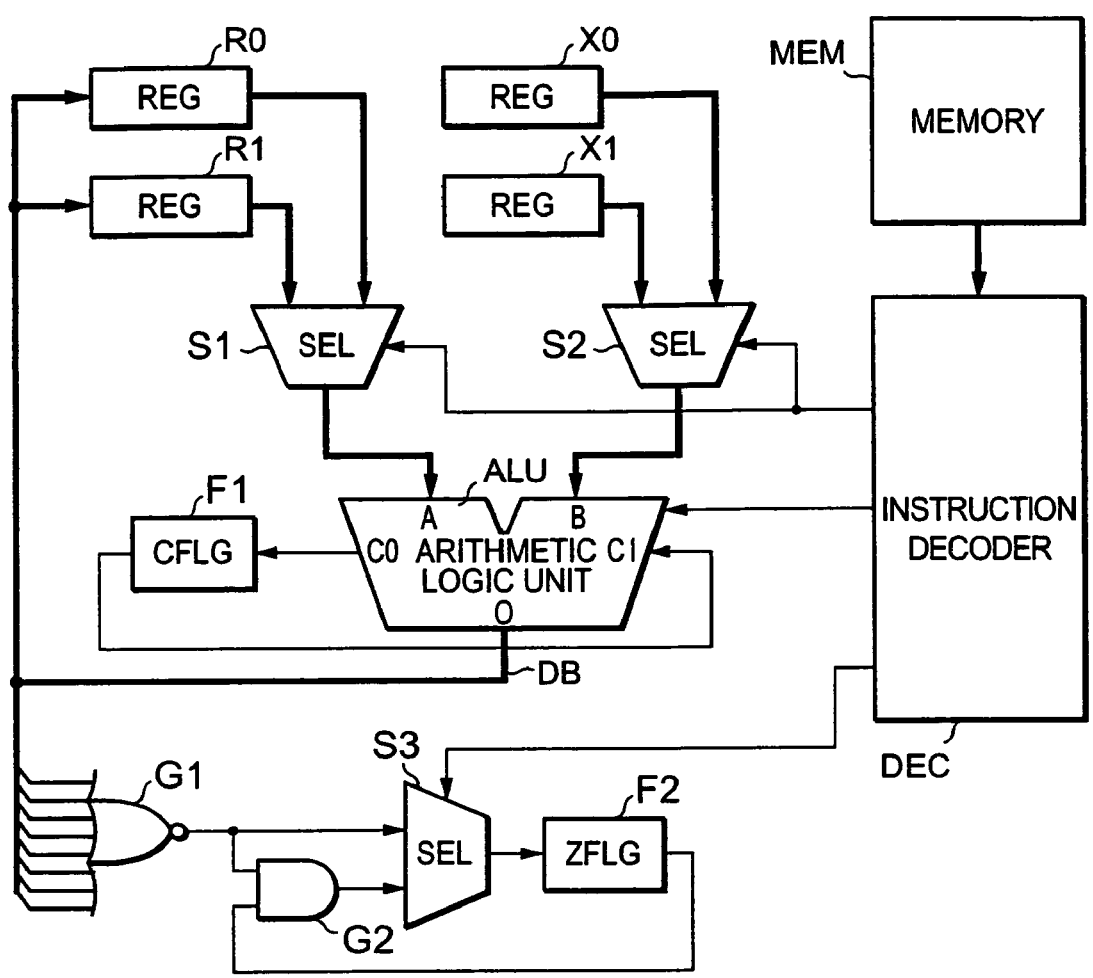
FIG. 1 is a block diagram showing an arithmetic circuit according to a first embodiment of the present invention.

FIG. 1 is a block diagram of an arithmetic circuit showing a first embodiment of the present invention.

The arithmetic circuit is one wherein in a microprocessor or the like, an 8-bit adder-subtractor is used to perform addition and subtraction of 16-bit integers. The arithmetic circuit has registers (REG) R0 and R1 each of which sets an augend (or minuend) and stores the result of addition (or subtraction) after its arithmetical operation, and registers X0 and X1 for respectively setting an addend (or subtrahend). Any of the registers R0, R1, X0 and X1 has an 8-bit data width. Lower 8 bits are set to the registers R0 and X0, and upper 8 bit are set to the registers R1 and X1, respectively.

The values of the 8 bits set to the registers R0 and R1 are supplied to a 8-bit input terminal A of a computing circuit or arithmetic logic unit (e.g., adder-subtractor) ALU through a selector S1, and the values of the 8 bits set to the registers X0 and fX1 are supplied to a 8-bit input terminal B of the arithmetic logic unit ALU through a selector S2. The arithmetic logic unit ALU has a 8-bit output terminal O for outputting the result of arithmetic operation, a carry input terminal CI and a carry output terminal CO in addition to the input terminals A and B and is capable of selectively executing addition, subtraction, addition with a carry, subtraction with a carry, etc. in accordance with a control signal CON.

The input side of a C flag (CFLAG) F1 comprised of a flip-flop or the like is connected to the carry output terminal CO of the arithmetic logic unit ALU. The output side of the C flag F1 is connected to the carry input terminal CI of the arithmetic logic unit ALU. The output terminal O of the arithmetic logic unit ALU is connected to the input sides of the registers R0 and R1 through a data bus DB having a 8-bit width and connected to the input sides of a determining circuit (e.g., a 8-input negative logical sum (hereinafter called "NOR") gate) G1.

The output side of the NOR gate GI is connected to a first input side of a logic circuit (e.g., a two-input logical product (hereinafter called "AND") gate) G2 and a first input side of a selecting circuit (e.g., a selector) S3. The output side of the selector S3 is connected to its corresponding input side of a holding circuit (e.g., a Z flag (ZFLG)) F2 comprised of a flip-flop or the like. The output side of the Z flag F2 is connected to its corresponding second input side of the AND gate G2.

The selectors S1 through S3 and arithmetic logic unit ALU are sequentially controlled according to instruction codes sequentially read from a memory MEM and decoded by an instruction decoder DEC.

Figure 2A:
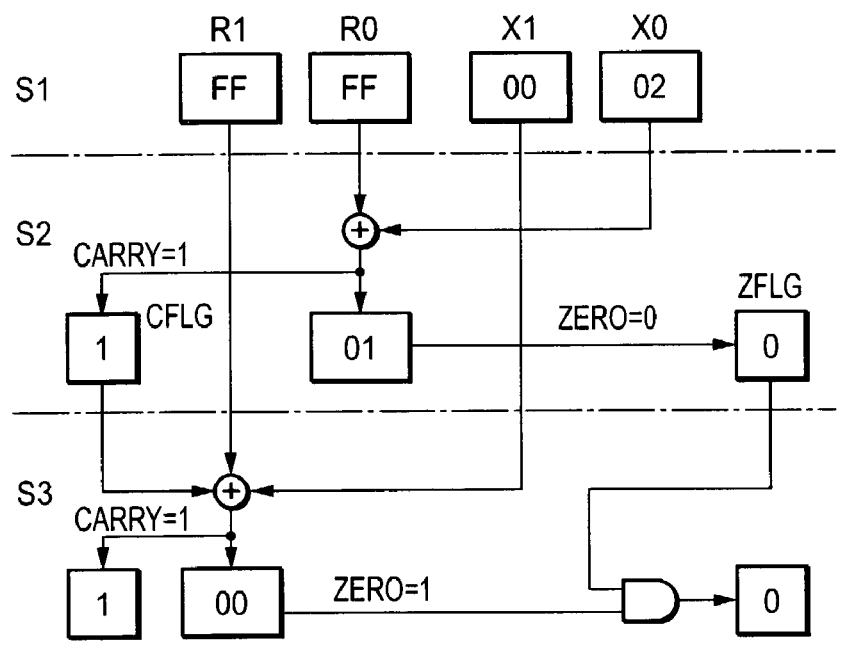
FIG. 2(a) is a diagram illustrating add processing of the arithmetic circuit shown in FIG. 1.
Figure 2B:
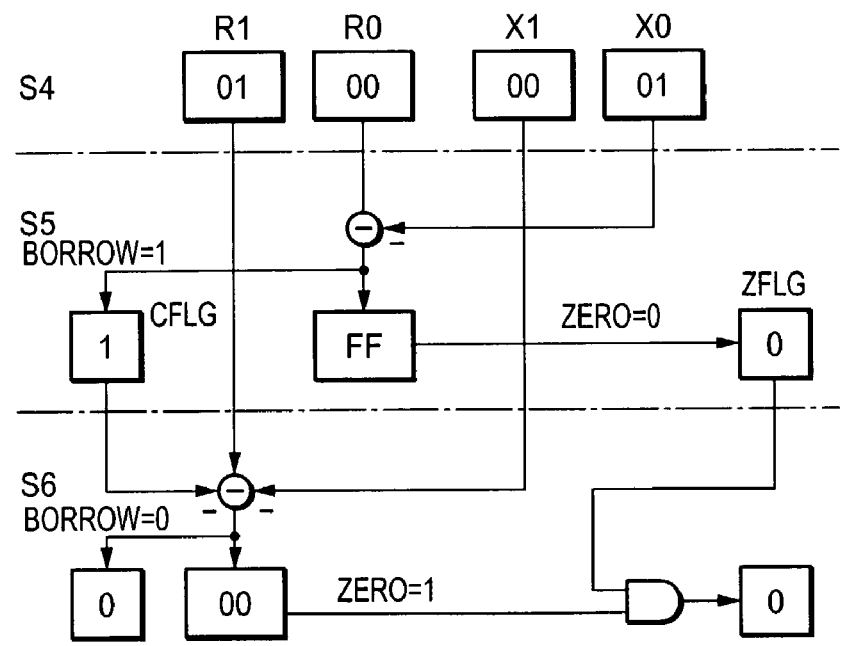
FIG. 2(b) is a diagram depicting subtract processing of the arithmetic circuit shown in FIG. 1.

FIGS. 2($a$) and ($b$) are respectively diagrams for describing the operation of the arithmetic circuit shown in FIG. 1, wherein FIG. 2($a$) shows one example of add processing and FIG. 2($b$) illustrates one example of subtract processing. The operation of the arithmetic circuit shown in FIG. 1 will be described in parts as the add processing (1) and the subtract processing (2) while referring to FIGS. 2($a$) and 2($b$). Incidentally, the series of programs stored in the memory MEM in advance are sequentially decoded by the instruction decoder DEC, so that the following operations are controlled by control signals indicative of the results of decoding by the instruction decoder DEC.

(1) Add Processing

A description will now be made, as an example, of a case in which a hexadecimal number 0002h is added to a hexadecimal number FFFFh (where "h" means hexadecimal notation).

First of all, lower 8 bits (i.e., FFh) and upper 8 bits (i.e., FFh) of an augend are respectively set to the registers R0 and R1 as shown in Step S1 of FIG. 2($a$). Further, lower 8 bits (i.e., 02h) and upper 8 bits (i.e., 00h) of an addend are respectively set to the registers X0 and X1.

Next, the selectors S1 and S2 are respectively switched over to the registers R0 and X0, and the selector S3 is switched to the NOR gate G1. A control signal for executing an add arithmetic operation is outputted to the arithmetic logic unit ALU. Thus, as shown in Step S2 of FIG. 2($a$), the arithmetic logic unit ALU adds the values of the registers R0 and X0 together and outputs 8 bits (i.e., 01h) corresponding to the result of addition from the output terminal O, followed by being stored in the register R0. A carry signal indicative of a carry is outputted from the carry output terminal CO of the arithmetic logic unit ALU so that the C flag F1 is set to "1". Further, the NOR gate G1 performs NORing of 8 bits outputted from the output terminal O and sets the result of NORing ("0" in this case) to the Z flag F2 via the selector S3.

Thereafter, the selectors S1 and S2 are respectively switched to the registers R1 and X1, and the selector S3 is switched to the AND gate G2. A control signal for executing an add arithmetic operation with a carry is then outputted to the arithmetic logic unit ALU. Thus, as shown in Step S3 of FIG. 2($a$), the arithmetic logic unit ALU adds the values of the registers R1 and X1 and the value of the C flag F1 together and outputs 8 bits (i.e., 00h) corresponding to the result of addition from the output terminal O, followed by being stored in the register R1. A carry signal indicative of a carry is outputted from the carry output terminal CO of the arithmetic logic unit ALU so that the C flag F1 is set to "1".

On the other hand, the NOR gate G1 performs NORing of 8 bits outputted from the output terminal O and supplies the result of NORing ("1" in this case) to the first input side of the AND gate G2. The AND gate G2 ANDs the output signal of the NOR gate G1 and the value (i.e., "0") set to the Z flag F2 in Step S2 and sets the value (i.e., "0") of the result of ANDing to the Z flag F2 anew.

Thus, the value of the added result of 17 bits, i.e., 10001h is obtained at the C flag F1 and registers R1 and R0. Further, "0" is set to the Z flag F2, so that it is shown therein that the values of 16 bits for the registers R1 and R0 are not 0000h respectively.

(2) Subtract Processing

A description will now be made, as an example, of a case in which a hexadecimal number 0001h is subtracted from a hexadecimal number 0100h.

As shown in Step S4 of FIG. 2($b$), lower 8 bits (i.e., 00h) and upper 8 bits (i.e., 01h) of a minuend are first set to the registers R0 and R1 respectively. Further, lower 8 bits (i.e., 01h) and upper 8 bits (i.e., 00h) of a subtrahend are respectively set to the registers X0 and X1.

Next, the selectors S1 and S2 are respectively switched over to the registers R0 and X0, and the selector S3 is switched to the NOR gate G1. A control signal for executing a subtract arithmetic operation is outputted to the arithmetic logic unit ALU. Thus, as shown in Step S5 of FIG. 2($b$), the arithmetic logic unit ALU subtracts the value of the register X0 from that of the register R0 and outputs 8 bits (i.e., FFh) corresponding to the result of subtraction from the output terminal O, followed by storage in the register R0. A borrow signal indicative of borrow is outputted from the carry output terminal CO of the arithmetic logic unit ALU so that the C flag F1 is set to "1". Further, the NOR gate G1 performs NORing of 8 bits outputted from the output terminal O and sets the result of NORing ("0" in this case) to the Z flag F2 via the selector S3.

Thereafter, the selectors S1 and S2 are respectively switched to the registers R1 and X1, and the selector S3 is switched to the AND gate G2. A control signal for executing a subtract arithmetic operation with a carry is outputted to the arithmetic logic unit ALU. Thus, as shown in Step S6 of FIG. 2($b$), the arithmetic logic unit ALU subtracts the values of the register X1 and C flag F1 from the value of the register R1 and outputs 8 bits (i.e., 00h) corresponding to the result of subtraction from the output terminal O, followed by being stored in the register R1. A borrow signal indicative of borrow is not outputted from the carry output terminal CO of the arithmetic logic unit ALU so that the C flag F1 is set to "0".

On the other hand, the NOR gate G1 performs NORing of 8 bits outputted from the output terminal O and supplies the result of NORing ("1" in this case) to the first input side of the AND gate G2. The AND gate G2 ANDs the output signal of the NOR gate GI and the value (i.e., "0") set to the Z flag F2 in Step S5 and sets the value (i.e., "0") of the result of ANDing to the Z flag F2 anew.

Thus, the value of the subtracted result of 17 bits, i.e., 000FFh is obtained at the C flag F1 and registers R1 and R0. Further, "0" is set to the Z flag F2, so that it is shown therein that the values of 16 bits for the registers R1 and R0 are not 0000h respectively.

In the case of the addition and subtraction with the carries as described above, the arithmetic circuit according to the first embodiment sets a new Z flag, based on the ANDing of a Z flag based on the result of most-recently executed addition and subtraction and a Z flag obtained from the result of this arithmetic operation. Thus, an advantage is brought about in that the value of the Z flag on which the whole result of arithmetic operation is reflected, is obtained without the need for add processing.

(Second Embodiment)

Figure 3:
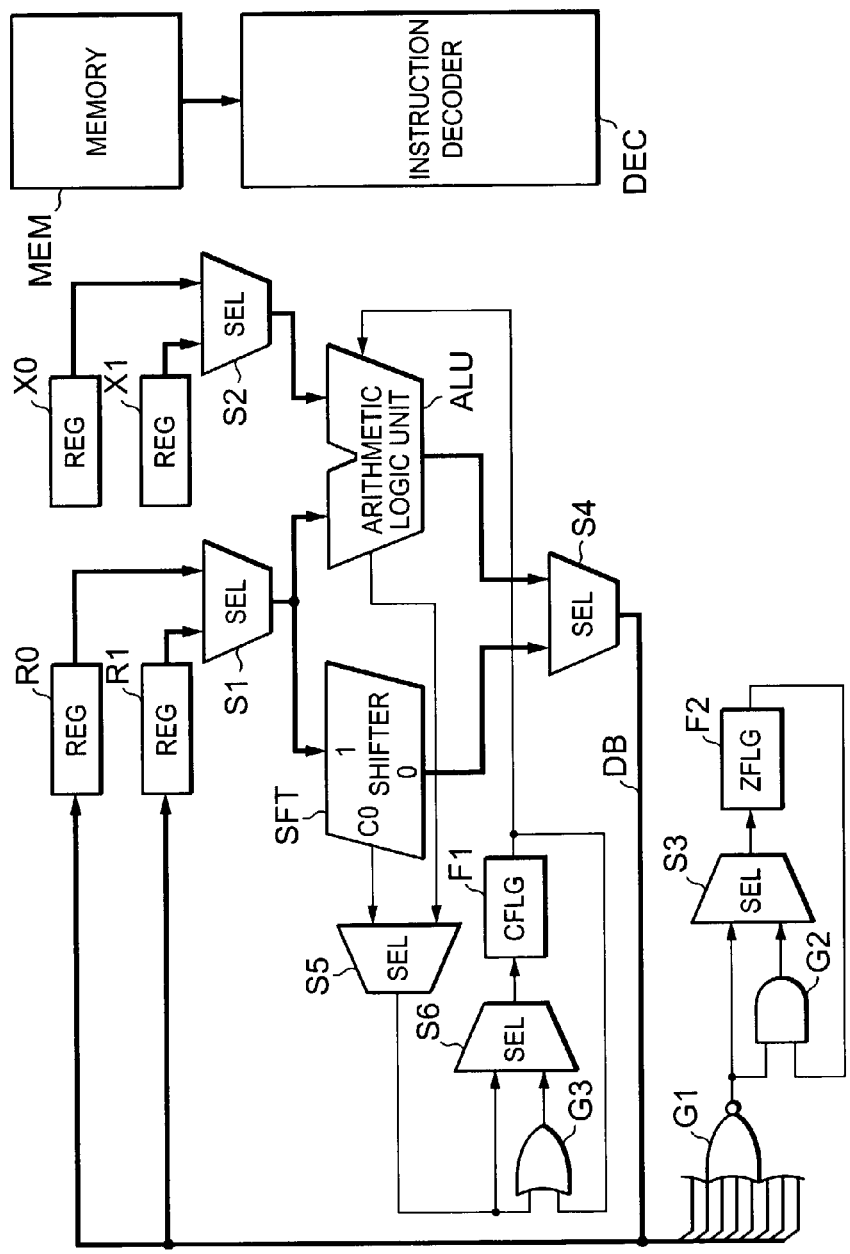
FIG. 3 is a block diagram of an arithmetic circuit showing a second embodiment of the present invention.

FIG. 3 is a block diagram of an arithmetic circuit showing a second embodiment of the present invention. Elements of structure common to the elements shown in FIG. 1 are respectively identified by common reference numerals.

The arithmetic circuit is one wherein the arithmetic circuit shown in FIG. 1 is provided with a computing circuit (e.g., shifter) SFT, selectors S4, S5 and S6, and a logic circuit (e.g., a two-input logical sum (hereinafter called "OR") gate) G3. The shifter SFT left-shifts data of 8 bits selected by a selector S1 in one-bit units. Namely, when an unillustrated control signal is supplied from an instruction decoder DEC to the shifter SFT, the shifter SFT shifts 8-bit data supplied to its input terminal I to the left one bit by one bit. At this time, the most significant bit is outputted from a carry output terminal CO of the shifter SFT as a carry signal. Further, "0" is set as the least significant bit, and the 8-bit data corresponding to the result of shifting is outputted from an output terminal O of the shifter SFT.

The selector S4 selects either one of data outputted from the output terminal O of the shifter SFT and an output terminal O of an arithmetic logic unit ALU and outputs it to a data bus DB.

Further, the selector S5 selects either one of the carry signal outputted from the shifter SFT and a carry signal outputted from the arithmetic logic unit ALU. The output side of the selector S5 is connected to a first input side of the selector S6 and a first input side of the OR gate G3. The output side of the selector S6 is connected to its corresponding input side of a C flag F1, and the output side of the C flag F1 is connected to a second input side of the OR gate G3 and a carry input terminal CI of the arithmetic logic unit ALU.

These selectors S4 through S6 and shifter SFT are sequentially controlled according to instruction codes sequentially read from a memory MEM and decoded by the instruction decoder DEC in a manner similar to other selectors S1 through S3 and arithmetic logic unit ALU. Other configurations are similar to those shown in FIG. 1.

When add and subtract instructions are executed by such an arithmetic circuit, the selectors S1 through S6 are switched so as to bring about configurations similar to FIG. 1, so that the operation described in the first embodiment is performed.

On the other hand, when a shift instruction is executed by the arithmetic circuit, the selectors S4 and S5 are respectively switched to the shifter SFT.

Figure 4:
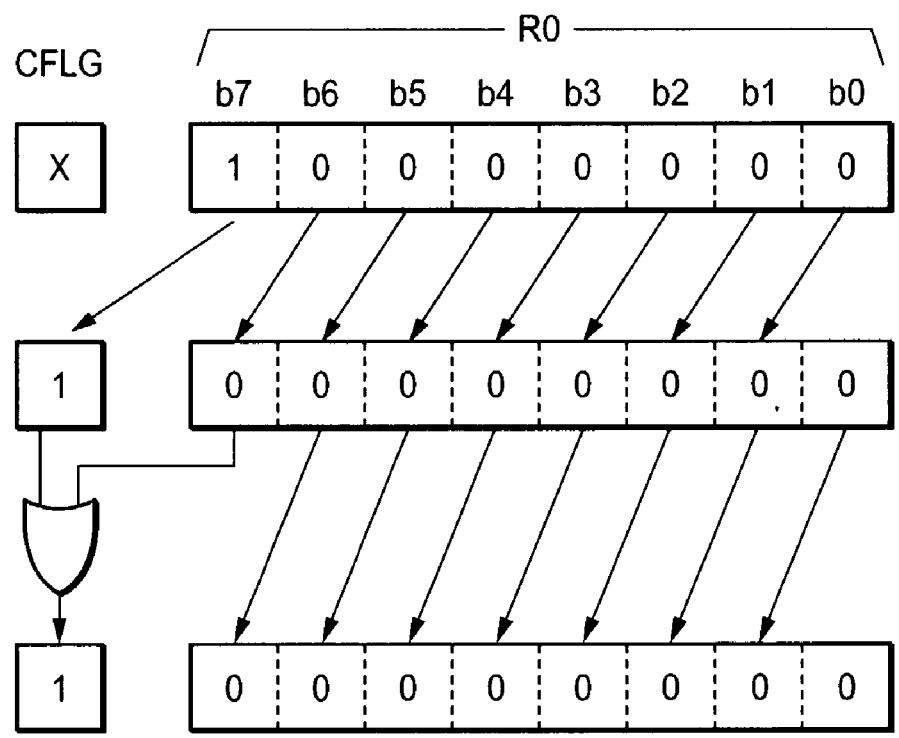
FIG. 4 is an operation explanatory diagram showing a shift operation of the arithmetic circuit shown in FIG. 3.

FIG. 4 is an operation explanatory diagram showing a shift operation executed in the arithmetic circuit shown in FIG. 3.

The shift operation shown in FIG. 3 will be explained below while referring to FIG. 4 with a case in which a hexadecimal number 80h of 8 bits is shifted to the left by 2 bits, as an example.

As shown in Step S11 of FIG. 4, the hexadecimal number 80h is set to a register R0.

Next, a control signal for executing a left shift is supplied to the shifter SFT. Thus, the selector S6 is switched to the selector S5, so that the hexadecimal number $80h$ of the register R0 is retained in the shifter SFT and a one-bit left shift is carried out. As a result, as shown in Step S12 of FIG. 4, the most significant bit b7 (i.e., "1") of the hexadecimal number 80h is outputted from the shifter SFT as a carry signal and held in the C flag F1. The result of its shift reaches 00h. The data outputted from the output terminal O of the shifter SFT is stored in the register R0 via the selector S4 and the data bus DB. Accordingly, the value of the register R0 results in 00h.

Subsequently, a signal for executing a left shift with a carry is outputted to the shifter SFT. Consequently, the selector S6 is switched to the OR gate G3, so that the value 00h of the register R0 is retained in the shifter SFT and a one-bit left shift is performed. Consequently, the result of shift outputted from the output terminal O of the shifter SFT assumes 00h as shown in Step S13 of FIG. 4 and is then stored in the register R0 via the selector S4 and the data bus DB.

On the other hand, the OR gate G3 ORs the carry signal ("0" in this case) outputted from the shifter SFT and the value (i.e., "1") set to the C flag F1 in Step S12 and sets the result of ORing (i.e., "1") to the C flag F1 anew.

In the case of the shift with the carry as described above, the arithmetic circuit according to the second embodiment sets a new C flag, based on the ORing of a C flag based on the result of the most-recently executed shift and a C flag obtained from the result of this shift. Thus, an advantage is brought about in that the value of the C flag on which the whole result of arithmetic operation is reflected, is obtained without the need for add processing.

Incidentally, the present invention is not limited to the above-described embodiments. Various changes may be made thereto. As modifications thereof, may be mentioned, for example, the following ones.

(a) While the present invention shows the example applied to the Z flag indicative of whether the result of addition/subtraction by the arithmetic logic unit ALU is zero, the present invention is similarly applicable even to Z flags for any result of arithmetic operation.

(b) While the present invention has described the arithmetic logic unit ALU and shifter SFT as the computing circuit by way of example, such an arithmetic circuit that data large in bit width is computed plural times in a divided form, is similarly applicable if the arithmetic circuit is adopted.

(c) The bit width used for the register R0 or the like is not limited to 8 bits.

(d) While the present invention has described the example in which the 8-bit arithmetic logic unit ALU is continuously used twice to thereby perform the addition and subtraction of 16-bit data, the arithmetic logic unit ALU can be continuously used four times, for example, to compute 32-bit data.

(e) The present invention is not limited to the Z flag and the C flag and is similarly applicable even to status information about other results of arithmetic operations.

According to a first invention as described above in detail, an arithmetic circuit includes a logic circuit for effecting logic operation processing on status information about the present result of arithmetic operation and status information held in a holding circuit, and a selecting circuit for selecting either a signal outputted from the logic circuit or the status information about the present result of arithmetic operation and holding it in the holding circuit. It is thus possible to obtain status information on which the states of the results of continuous arithmetic operations are reflected.

According to a second invention, an arithmetic circuit has a logic circuit for outputting a signal indicative of the result of arithmetic operation being zero only where the result of arithmetic operation determined by a determining circuit and the result of arithmetic operation held in a holding circuit are both zero, and a selecting circuit for selecting either the output signal of the logic circuit or status information about the present result of arithmetic operation determined by the determining circuit and holding it in the holding circuit. It is thus possible to obtain information as to whether the results of continuous arithmetic operations are all zero.

According to a third embodiment, an arithmetic circuit includes a logic circuit for outputting a signal indicative of the presence of a carry in the result of arithmetic operation where the carry is produced in at leas one of the present result of arithmetic operation and the result of arithmetic operation held in the holding circuit, and a selecting circuit for selecting either the output signal of the logic circuit or status information about the present result of arithmetic operation and holding it in the holding circuit. It is thus possible to obtain information as to whether the carry is produced at least once in the results of continuous arithmetic operations.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An arithmetic circuit, comprising:
    an arithmetic circuit performing an arithmetic operation of a predetermined bit width in accordance with an arithmetic instruction;
    a holding circuit storing status information about the arithmetic operation by the arithmetic circuit;
    a logic circuit having a function of a logic operation, the logic circuit receiving the status information stored in the holding circuit and the status information about a present result of arithmetic operation; and
    a selector for selecting either the status information about the present result of arithmetic operation or a signal outputted from the logic circuit in accordance with a control signal based on the arithmetic instruction and supplying the selected signal to the holding circuit.

2. An arithmetic circuit according to claim 1, further including
    a memory for storing the arithmetic instruction; and
    an instruction decoder connected to the memory for producing the control signal based on the arithmetic instruction.

3. An arithmetic circuit according to claim 1, further including
    a first register holding a first data having the predetermined bit width outputted from the arithmetic circuit;
    a second register holding a second data having the predetermined bit width outputted from the arithmetic circuit;
    a third register holding a third data having the predetermined bit width;
    a fourth register holding a fourth data having the predetermined bit width;
    a first selector for selecting either the first data or the second data in accordance with an arithmetic instruction and outputting the selected data to the arithmetic circuit; and
    a second selector for selecting either the third data or the fourth data in accordance with an arithmetic instruction and outputting the selected data to the arithmetic circuit.

4. An arithmetic circuit according to claim 1, wherein the logic circuit is an AND gate.

5. An arithmetic circuit according to claim 1, wherein the holding circuit is a flip-flop.

6. An arithmetic circuit according to claim 1, wherein the arithmetic circuit is an arithmetic logic unit.

7. An arithmetic circuit, comprising:
    an arithmetic circuit performing an arithmetic operation of a predetermined bit width in accordance with an arithmetic instruction and outputting a result of the arithmetic operation;
    a determination circuit outputting a determination signal when the result of the arithmetic operation is zero;
    a holding circuit storing the determination signal;
    a logic circuit receiving the determination signal stored in the holding circuit and the output of the determination circuit and outputting the determination signal when both of the received signals are the determination signals; and
    a selector for selecting either the output signal of the logic circuit or the output signal of the holding circuit and for outputting a signal to the holding circuit.

8. An arithmetic circuit according to claim 7, further including
    a memory for storing the arithmetic instruction; and
    an instruction decoder connected to the memory for producing the control signal based on the arithmetic instruction.

9. An arithmetic circuit according to claim 7, further including
    a first register holding a first data having the predetermined bit width outputted from the arithmetic circuit;
    a second register holding a second data having the predetermined bit width outputted from the arithmetic circuit;
    a third register holding a third data having the predetermined bit width;
    a fourth register holding a fourth data having the predetermined bit width;
    a first selector for selecting either the first data or the second data in accordance with an arithmetic instruction and outputting the selected data to the arithmetic circuit; and
    a second selector for selecting either the third data or the fourth data in accordance with an arithmetic instruction and outputting the selected data to the arithmetic circuit.

10. An arithmetic circuit according to claim 7, wherein the logic circuit is an AND gate.

11. An arithmetic circuit according to claim 7, wherein the holding circuit is a flip-flop.

12. An arithmetic circuit according to claim 7, wherein the arithmetic circuit is an arithmetic logic unit.

13. An arithmetic circuit according to claim 7, wherein the determination circuit is an exclusive NOR circuit.

14. An arithmetic circuit, comprising:
   an arithmetic circuit performing an arithmetic operation of a predetermined bit width in accordance with an arithmetic instruction and outputting a result of the arithmetic operation, the arithmetic circuit further outputting a carry signal when the result of the arithmetic operation produces a carry;
   a holding circuit storing the carry signal;
   a logic circuit receiving the carry signal stored in the holding circuit and the carry signal outputted from the arithmetic circuit, the logic circuit outputting the carry signal when it receives the carry signal; and
   a selector for selecting either the output signal of the arithmetic circuit or the output signal of the logic circuit in accordance with the arithmetic instruction.

15. An arithmetic circuit according to claim 14, further including
   a memory for storing the arithmetic instruction; and
   an instruction decoder connected to the memory for producing the control signal based on the arithmetic instruction.

16. An arithmetic circuit according to claim 14, further including
   a first register holding a first data having the predetermined bit width outputted from the arithmetic circuit;
   a second register holding a second data having the predetermined bit width outputted from the arithmetic circuit;
   a third register holding a third data having the predetermined bit width;
   a fourth register holding a fourth data having the predetermined bit width;
   a first selector for selecting either the first data or the second data in accordance with the arithmetic instruction and outputting the selected data to the arithmetic circuit; and
   a second selector for selecting either the third data or the fourth data in accordance with the arithmetic instruction and outputting the selected data to the arithmetic circuit.

17. An arithmetic circuit according to claim 14, wherein the logic circuit is a NOR gate.

18. An arithmetic circuit according to claim 14, wherein the holding circuit is a flip-flop.

19. An arithmetic circuit according to claim 14, wherein the arithmetic circuit is an arithmetic logic unit.

20. An arithmetic circuit according to claim 14, further comprising
   a shift circuit for shifting data output from the arithmetic circuit and outputting the shifted data, the shift circuit further outputting a carry signal when the most upper bit of the received data is "1";
   a first selector for selecting either the output signal of the shift circuit or the output signal of the arithmetic circuit in accordance with the arithmetic instruction and outputting the selected data to the selector; and
   a second selector for selecting either the shifted data or the arithmetic operated data in accordance with the arithmetic instruction and outputting the selected data.

* * * * *